(12) United States Patent
Wurst et al.

(10) Patent No.: US 8,701,472 B2
(45) Date of Patent: Apr. 22, 2014

(54) METHOD FOR DETERMINING CENTERS OF MASS FOR LARGE STRUCTURES

(75) Inventors: Oliver Wurst, Rostock (DE); Martin-Christoph Wanner, Nienhagen (DE); Birger Schubert, Bargeshagen (DE)

(73) Assignees: Fraunhofer-Gesellschaft zur Foerderung der angewandten Forschung e.V., Munich (DE); Universität Rostock, Rostock (DE)

( * ) Notice: Subject to any disclaimer, the term of this patent is extended or adjusted under 35 U.S.C. 154(b) by 1133 days.

(21) Appl. No.: 12/595,284

(22) PCT Filed: Apr. 9, 2008

(86) PCT No.: PCT/EP2008/002967
§ 371 (c)(1),
(2), (4) Date: Nov. 23, 2009

(87) PCT Pub. No.: WO2008/122448
PCT Pub. Date: Oct. 16, 2008

(65) Prior Publication Data
US 2010/0084201 A1  Apr. 8, 2010

(30) Foreign Application Priority Data
Apr. 10, 2007 (DE) .......................... 10 2007 017 462

(51) Int. Cl.
*G01M 1/12* (2006.01)
*G01G 19/14* (2006.01)
(52) U.S. Cl.
USPC .......................... 73/65.07; 73/65.01; 177/147

(58) Field of Classification Search
USPC ........... 177/145, 147; 73/65.01, 65.07, 65.08, 73/65.04
See application file for complete search history.

(56) References Cited

U.S. PATENT DOCUMENTS 2,995,924 A * 8/1961 Karpovich .................. 73/65.01
3,174,330 A * 3/1965 Boundy ....................... 73/65.01
(Continued)

FOREIGN PATENT DOCUMENTS

DE          3629244 A1    3/1987
DE          29622132      3/1998
(Continued)

OTHER PUBLICATIONS

Machine translation of JP 3,643,974 downloaded Dec. 18, 2012.*
(Continued)

*Primary Examiner* — Randy W Gibson
*Assistant Examiner* — Natalie Huls
(74) *Attorney, Agent, or Firm* — Faegre Baker Daniels LLP (57) ABSTRACT

The spatial center of mass and a mass of an object can be determined by orientating the suspended object in at least two different spatial positions and measuring the orientation of the object in each of the different spatial positions the forces acting on the suspension devices because of the suspended object, the forces acting on the suspension devices being resolved into three independent force components. A center of area of the object and the associated force effect lines are determined for each of the at least two spatial positions, the center of area of the respective spatial position being determined with an inclined tension compensation of the suspension devices. The spatial center of mass is determined by superimposing at least two force effect lines.

12 Claims, 6 Drawing Sheets

(56) References Cited

U.S. PATENT DOCUMENTS

| | | | |
|---|---|---|---|
| 3,290,925 A * | 12/1966 | Wallace | 73/65.01 |
| 3,388,589 A * | 6/1968 | Campbell | 73/65.01 |
| 3,889,524 A * | 6/1975 | Glushko et al. | 73/65.01 |
| 5,081,865 A * | 1/1992 | Schechter et al. | 73/65.07 |
| 5,589,646 A * | 12/1996 | Khachaturian et al. | 73/862.474 |
| 7,278,295 B2 * | 10/2007 | Mastinu et al. | 73/65.08 |
| 2006/0010965 A1 * | 1/2006 | Mastinu et al. | 73/65.07 |

FOREIGN PATENT DOCUMENTS

| | | | |
|---|---|---|---|
| EP | 0 892 256 | 1/1999 | |
| GB | 2 414 562 | 11/2005 | |
| JP | 3643974 * | 4/2005 | B66C 1/12 |
| SU | 1677543 * | 9/1991 | G01M 1/12 |
| WO | WO 92/22458 | 12/1992 | |
| WO | WO 94/09347 | 4/1994 | |

OTHER PUBLICATIONS

Human Translation of SU1677543.*
Human translation of SU 1677543 A1; Drozdov et al.*
International Preliminary Report on Patentability, Chapter II, issued in PCT/EP2008/002967, mailed Jun. 16, 2009, with English Translation.
International Search Report Issued in PCT/EP/2008/002967, mailed Jul. 16, 2008, with English Translation.

* cited by examiner

METHOD FOR DETERMINING CENTERS OF MASS FOR LARGE STRUCTURES

CROSS-REFERENCE TO RELATED APPLICATION

The present application is a national phase application of PCT application PCT/EP2008/002967 filed pursuant to 35 U.S.C. §371, which claims priority to DE 10 2007 017 462.6 filed Apr. 10, 2007. Both applications are incorporated herein by reference in their entirety.

TECHNICAL FIELD

The invention relates to a method for determining a spatial center of mass or center of gravity and a mass or a weight of an object via a hoisting device. In general mass and weight are proportional to each other, as a result of which the center of mass and the center of gravity can be equated.

BACKGROUND

For objects of a small size and low weight, special devices are available for determining the spatial center of mass. These are used in aircraft and automobile construction and involve the use of weighing platforms having hoisting devices that are produced specially for the respective component to be measured. These weighing systems are known merely for objects of a small to average size and weight.

In particular in branches of industry which are involved with the manufacture of large structures, such as steel and shipbuilding enterprises, the experimental determination of the weight and in particular of the spatial center of mass of the structural units to be manufactured has scarcely been possible to date. In special fields, such as the construction of military or offshore objects in which the weight and the weight distribution represents a crucial role for the characteristic object properties, a complex weight and center of mass management is implemented. Information relating to the individual weights and the weight distribution thereof are determined theoretically with reference to material data and dimensions, deduced from supplier specifications or determined metrologically. The completeness and reliability of the supplied data and also the problem of quantification of all the materials and fittings, such as e.g. weld seams, insulation, preservative coatings, materials tolerances and the like, is hereby problematic.

WO 92/22458 A1 discloses a method for determining a spatial center of mass and a mass of an object using a hoisting device. The object is brought into position by a large number of cable winches. Once brought into position, both the total mass and the center of mass can be determined by the spacings of the cable winches. A disadvantage of this method is that the hoisting device has a very specific design and the calculation of the center of mass can be effected only inadequately.

Similarly in the state of the art disclosed in WO 92/22458, in order to determine the mass of a large object, the latter can be disposed on blocks, as are normally used for depositing structural units and sections. By integrating commercially available force sensors, determination of the weight of the object can be included without significant complexity in an operating sequence. With the same system, the center of mass of a steel-construction large structure can be determined at least in two dimensions. Furthermore, simple crane-based methods exist, and also stationary scales which however do not always meet the requirements with large structures and in the case of which the centre of mass can be determined likewise only in two dimensions.

SUMMARY

The present invention pertains to determining the spatial center of mass and the weight of bodies of any size using industrial crane units or hoisting devices. The permissible weight of the body to be analyzed and the maximum dimensions thereof are restricted merely by the capacity of the available hoisting device. The invention should be industrially suitable, extendable and user-friendly and also operate extensively automatically.

The method according to the invention allows determination of the spatial center of mass and the mass of an object using a hoisting device that has at least two different suspension devices. In some embodiments, the hoisting device has three or more different suspension devices. Each of the suspension devices has a suspension point and a cable element. In a first step, the object is suspended at at least two different object points, the object points respectively being connected to a suspension device of the hoisting device. In the suspended state, at least two different spatial positions of the object in space are measured. In each spatial position, the orientation of the object in the spatial position and the forces of the suspended object acting on the suspension points are measured. For each spatial position, a center of area of the object is obtained, i.e. the center of mass is determined in two coordinates. As a result, the center of area, relative to the center of mass, still has an undetermined coordinate; the center of area is hence actually a straight line in the entrained intrinsic object coordinate system which is orientated perpendicular to earth at the time of measurement and is often termed force effect line. Different spatial positions in the sense of the invention differ in that they can be converted one into the other neither by means of a rotation about a vertical axis, by means of a translatory movement nor by a combination of both. With the help of at least two centers of area, the spatial center of mass can be determined by superimposing the force effect lines which pass through the center of mass and perpendicular to the intrinsic object areas of the centers of area.

The method has the advantage that, because of the presence of at least two suspension devices, the spatial position of the object to be measured can be achieved by changing the cable lengths relative to each other. For this reason, the object need not be lowered and suspended at new suspension points in order to define the different spatial positions. This enables determination of the spatial center of mass in a very short time. The permissible weight of the object to be analyzed and the maximum dimensions thereof are thereby restricted only by the capacity of the available hoisting device, such as e.g. a crane unit which includes one or more cranes. Furthermore, the method can be implemented with the help of crane units already present since only the forces acting on the suspension devices are required to be determined.

The method for determining the centers of area and ultimately the centers of mass is based on being able to determine, with knowledge of the forces acting at the suspension points, the moment equilibrium with respect to the center of mass—and hence the position of the center of mass—with the help of simple mechanical equations.

In some embodiments, at least three suspension devices may be used in the case of very large or very heavy objects.

In some embodiments, a data evaluation unit is used to store or process measurements of the forces acting on the cable elements or suspension points. In this way, the centers of area and ultimately the center of mass can be determined in a rapid and uncomplicated manner. With the help of a data evaluation unit, it is possible to implement a constant measurement of the centers of area which change because of the different spatial positions, which allows a particularly rapid and reliable determination of the center of mass.

In some embodiments, measurement results with respect to the forces acting on the suspension points and the orientation of the object to be measured are transmitted without cables to the data evaluation unit. In some embodiments, the measurement results are transmitted by radio. Since the described method is conceived in particular for determining the center of mass of large structures, it is possible, because of the spatial dimensions of the large structures, that the measurements need not be taken manually but can be brought together by radio in the data evaluation unit. With the help of the data evaluation unit, evaluation of the measurement results can be effected automatically which leads to high acceptance and user friendliness. In some cases, more than two spatial positions can thereby be measured which leads to overdetermination of the center of mass since it involves a redundant equation system. In general, only approximate solutions can be determined with such systems. Because of the large number of measuring values which can be determined within the scope of the measurements, a stochastic evaluation can be effected, which can be used as a measure of the certainty of the measurement result.

In some embodiments, the suspension devices can be actuated separately and the length of the cable elements can be varied. This offers a great saving in time in the determination of the center of mass. In particular, different spatial orientations of the object are produced by changing the ratio of the lengths of the cable elements relative to each other and the orientation of the object can be determined starting therefrom. In some embodiments at least one inclination sensor that is mounted on the object determines the orientation of the object relative to space (or another fixed reference coordinate system) via determination of the angles relative to the fixed spatial axes. As a result, the measurement can be undertaken in a reliable and rapid manner in particular when a plurality of inclination sensors is present, and can be combined particularly well with the automatic evaluation capacity with the help of the data evaluation unit.

In some embodiments, the object is suspended on the suspension devices such that the cable elements have an inclined position of less than 10° relative to the perpendicular. In some embodiments, the cable elements have an inclined position of, less than 5° relative to the perpendicular. By having a low inclined tension, the forces acting on the cables describe virtually completely the weight of the object to be measured. The smaller the inclined position of the cable, the more precise is the measurement and determination of the weight without additional information with respect to the inclination of the suspension devices, and a more precise determination of the center of mass is correspondingly possible. In the case where an inclined position of the cable elements is not avoidable, developments according to the method of the invention can be used for compensation.

In some embodiments, the forces of the object acting on the suspension devices are determined by sensors. In particular, load shackles having integrated sensors can be used. An automatic evaluation capacity can be integrated in a rapid and reliable manner in particular when transmitting the measurement results by radio.

In order to calculate the center of mass, the forces acting on the cables can be used in different ways for calculation of the weight and of the center of mass. In an embodiment, the forces acting on the cables are resolved respectively into a vertical and horizontal force component. By determining the vertical force component on the individual suspension points, the weight of the object can be determined very exactly and calculation of the moments caused by the suspension points and hence the points of area and the center of mass are improved in their accuracy.

In some embodiments, the forces acting on the suspension points can be resolved into three independent force components. Cartesian spatial coordinates in which one axis may be orientated vertically are hereby possible. By measuring three different force components, a particularly exact determination of the center of mass can be undertaken.

In some embodiments, the connection between the object and the suspension devices takes place via a cardanic suspension. By using the cardanic suspension, the position or direction of the suspension device in space can be determined reliably.

In some embodiments, when measuring the weight of the object, the intrinsic weight of parts of the hoisting device which is used is known. Since in particular the weights of the hoisting device which are attached downstream of a force sensor can falsify the force measurements, it is possible, within the scope of for example a tare measurement, to measure forces acting on the force sensors without a suspended object. As a result, an improvement in the measurement result and in the determination of the center of mass can be achieved.

In some embodiments, a hoisting device has at least two or three different suspension devices that each have one cable element and one suspension point. The number of suspension devices is based on the weight and the dimensions of the object to be measured, so that, in the case of very large objects, a greater number of suspension devices can be used. The suspension devices can be respectively actuated separately and are free-hanging and have sensors with which orientation of a suspended object in space, such as for example the ratio of the free-hanging lengths of the cable elements to each other, can be determined. Furthermore, a data evaluation unit which is connected to the sensors is present.

In some embodiments, sensors are present for determining the cable inclination and/or the forces acting on the cable elements. In some embodiments, these sensors are connected to the data evaluation unit.

In some embodiments, the data evaluation unit is connected to at least one further inclination sensor that is mounted on an object suspended on the hoisting device. As a result, the data evaluation unit can put the coordinate system of an object via a transformation in a ratio to a spatially related coordinate system.

In some embodiments, the sensors that are used communicate with the data evaluation unit by radio.

Up till now, merely the possibility of suspending the object on at least two suspension devices and subsequently determining the center of mass has been discussed. In some embodiments, the object can be supported on at least two or three or more support devices each having one support point. By changing the positioning of the support devices such as by changing the effective height of the support device above the ground, the object is moved into different spatial positions. The forces acting on the support devices can be measured for each spatial position and the centers of area and the spatial centers of mass can be determined from the measurements. The only difference from the previously mentioned method is that the object is not suspended on the suspension devices but is supported by the support devices, such as, for example, blocks. By adjusting the height of the support devices, the different spatial positions can be produced analogously to the embodiment of the method in which the different ratios of the cable lengths to each other are changed. Merely the method variants which require particular embodiments of load shackles cannot be used directly in this embodiment.

In order to implement the method, a hoisting device is used which has at least two, three or more height-adjustable support devices each having at least one support point and, analogously to the hoisting device with suspension points, a data evaluation unit. The data evaluation unit is connected to sensors that determine a spatial position and/or orientation of an object supported thereon.

BRIEF DESCRIPTION OF THE FIGURES

The method according to the invention is intended to be explained subsequently in more detail with reference to an example. There are shown.

DETAILED DESCRIPTION

Figure 1:
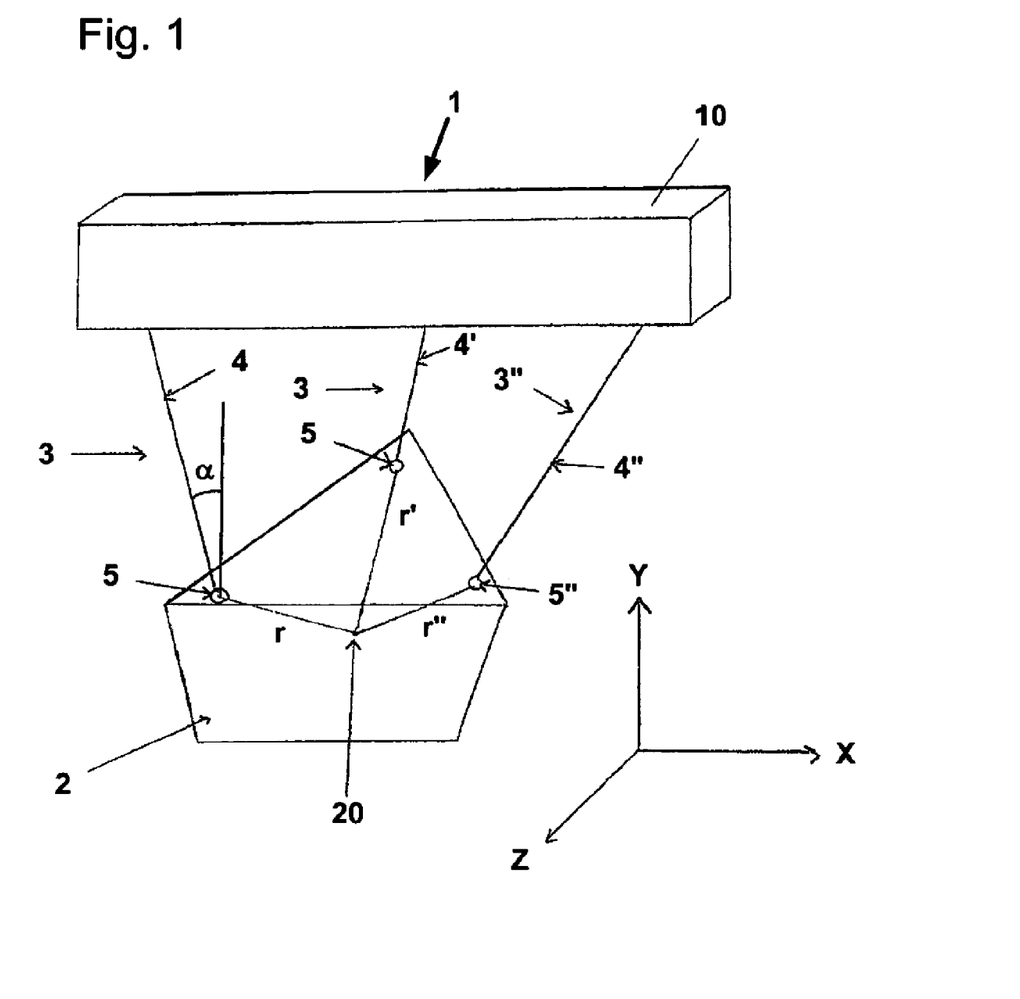
FIG. 1 shows a hoisting device with object to be measured.

FIG. 1 shows a hoisting device 1 and an object 2 mounted thereon, the center of mass 20 of which has to be determined. The hoisting device 1 has three suspension devices 3, 3', 3", the suspension devices each having respectively one cable element 4, 4', 4", and one suspension point 5, 5', 5". In some embodiments, the cable elements 4, 4', 4" are made of steel cables that can be changed in length and actuated separately respectively via winches that are not illustrated here.

In the illustrated embodiment, the object 2 is connected at three different places to the suspension points 5, 5', 5". By tensioning the cable elements 4, 4', 4", the object is raised and is stationary when the physical moments with respect to the center of mass of the object add up to zero and the acting forces in the suspension points compensate for the weight of the object. The moments are thereby formed via the forces which act on the suspension points 5, 5' and 5" with the distance of the suspension points from the center of mass. The suspension point 5 thereby is spaced a distance r in the illustrated direction, the suspension point 5' is spaced a distance r' in the illustrated direction and the suspension 5" is spaced a distance r" in the illustrated direction from the centre of mass 20 of the object.

In some embodiments, the method according to the invention can be implemented with more than three or only two suspension devices. The presence of more than three suspension devices in the case of very heavy or very large objects 2 is possible since, as a result, the forces acting on the individual suspension devices can be maintained within the scope of the useful load of the individual suspension device. Furthermore, the cables can also have an angle α which is measured from the perpendicular. For this purpose, an inclined tension compensation can be undertaken in the method and is described in the claims. In some embodiments, an attempt is usually made for the angle α to be <10°. In some embodiments, the angle α is <5°. The maximum useful load of the suspension devices can be utilized better by a small angular deviation.

On the suspension devices 3, 3', 3", devices are present for measuring the forces acting on the suspension device. These devices measure the force which acts on the suspension points 5, 5' and 5" because of the object 2. Different sensors can thereby be used. Thus, the tensile stress can be measured, for example, with the help of sensors. However it is also possible, in particular with large objects, to use load shackles and force measuring sensors which are mounted on the load shackles or integrated in the load shackles.

With the help of a cardanic suspension of the object which may be fitted at the suspension points 5, 5' and 5", twisting of the cable elements 4, 4', 4" is avoided and the measuring accuracy of the method is increased since—with a corresponding sensor system—the position for example of the steel cables in space can be determined with an inclination sensor system with the help of inclination sensors. With the help of a cardanic suspension, the sensors are connected rigidly to one end of a cardan joint on the cable side. As a result, only two changes in orientation of the sensors are possible, which can be determined with the help of inclination sensors. With the help of the cardanic suspension, the forces acting on the suspension points can be resolved into three Cartesian coordinates. In some embodiments, the angle of rotation of the cardan joints can also be determined. As a function of the inclined position of the steel cables, in particular when measuring large objects, a cardanic suspension can however be dispensed with, with the help of hoisting devices with long cable elements 4, 4' and 4" at small angles α, without substantially impairing the measuring accuracy.

In the following, a differentiation is made between an intrinsic object coordinate system ($x_0$, $y_0$, $z_0$) and a fixed spatial coordinate system (x, y, z). Both coordinate systems may be Cartesian although also other coordinate systems can be used. The spatial coordinate system has a vertical axis and can be transformed by means of two rotations into the intrinsic object coordinate system. The spatial coordinate system serves with each individual measurement as auxiliary system. Thus in particular the centres of area or the force effect lines are transformed from the spatial coordinate system into the intrinsic object coordinate system.

Figure 2A:
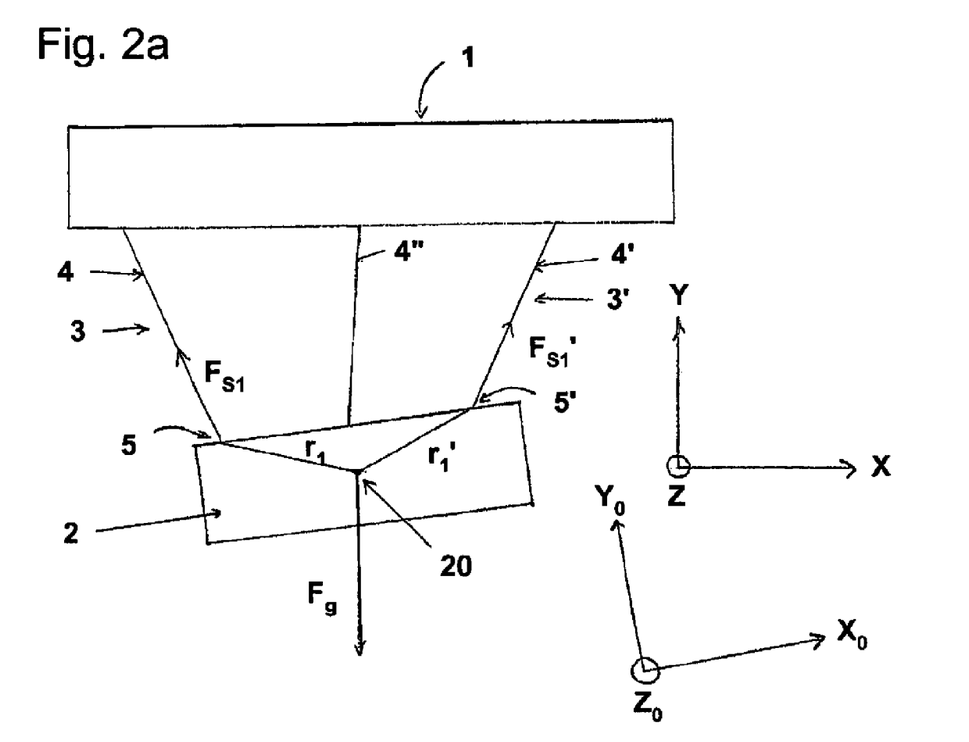
FIGS. 2a and 2b show first and second spatial positions of the object to be measured.
Figure 2B:
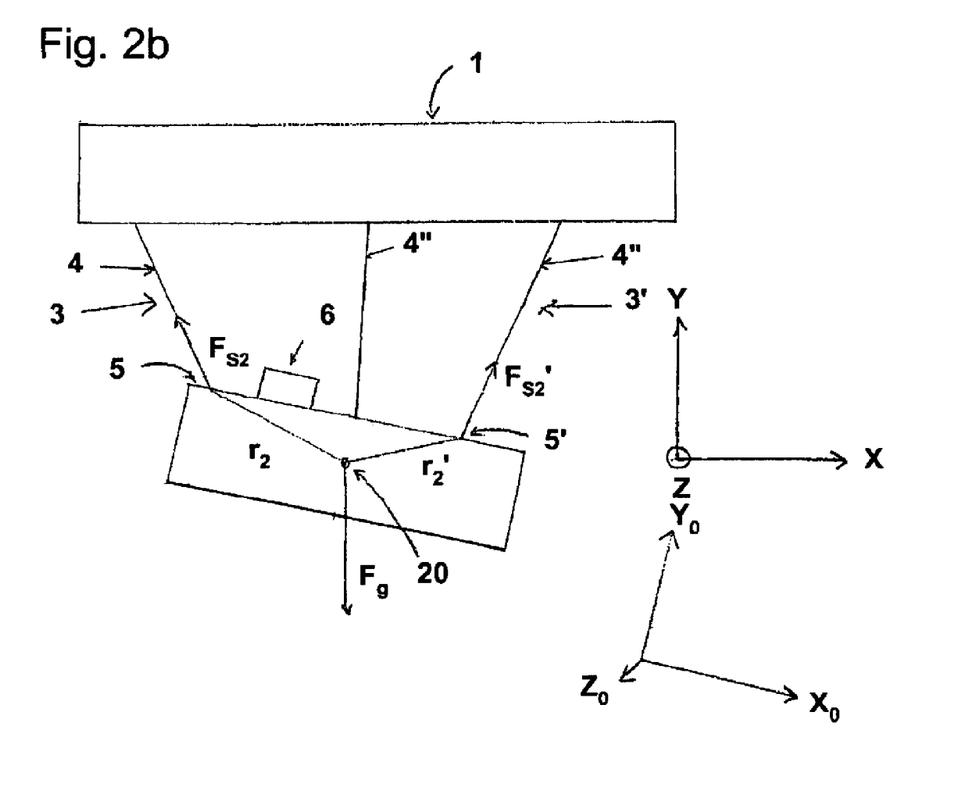

In FIG. 2a, the suspended object 2 is shown in the xy-plane in a first position or in a first spatial position. On the suspension devices 3, 3' or 3", a force $F_{S1}$, $F_{S1}'$ or $F_{S1}"$ thereby acts in the cable direction which compensates for the weight $F_G$ of the object 2. The sum of the physical moments or of the centre of mass which are produced from the spacing $r_1$, $r_1'$ or r" and the force $F_{S1}$, $F_{S1}'$ or $F_{S1}"$ has a total of 0 if the object is situated at rest. By calculating the physical moments and the forces acting on the cables, the position of the center of mass 20 of the object 2 can be determined in the xz-plane of the spatial coordinate system. The position of the center of mass 20 consequently has another degree of freedom in the y-direction of the spatial coordinate system. In this respect, the center of area of the object is determined in the intrinsic object coordinates of the xz-plane in space. Care should be taken that the xz-plane in space is not necessarily in accordance with the $x_0 y_0$-plane of the intrinsic object coordinate system. In FIGS. 2a and b, the centroidal axis which extends along the y-axis in space is not located along the $y_0$-axis of the object.

In order to determine the center of mass 20 of the object 2, at least one second center of area of the object 2 which does not correspond with the first center of area is measured, i.e. the at least two centers of area in the intrinsic object coordinate system have different force effect lines. For this reason, due to a change in the lengths of the cable elements, 4, 4' and 4", the object 2 in space is moved into a second spatial position which is different from the first. By changing the lengths of the cable elements relative to each other, the moments resulting from the suspension forces and the intrinsic object plane of the second center of area no longer corresponds with the plane of the first center of area. Possibly, a change in the moments which act on the object 2 can also be achieved in that the hoisting device is per se inclined, so that the moments of rotation change if a change in the cable length of the object is not possible.

In FIG. 2b, the object 2 is located in a second spatial position, which is characterised by the different position of the intrinsic object coordinate system $x_0$, $y_0$, $z_0$ relative to the coordinate system x, y, z of the space. In the second position, other forces and other moments act on the cable elements 4, 4' and 4". From the physical moments, in turn the center of area can be calculated in the intrinsic body coordinates of the second position of the spatial xz-plane.

Figure 3:
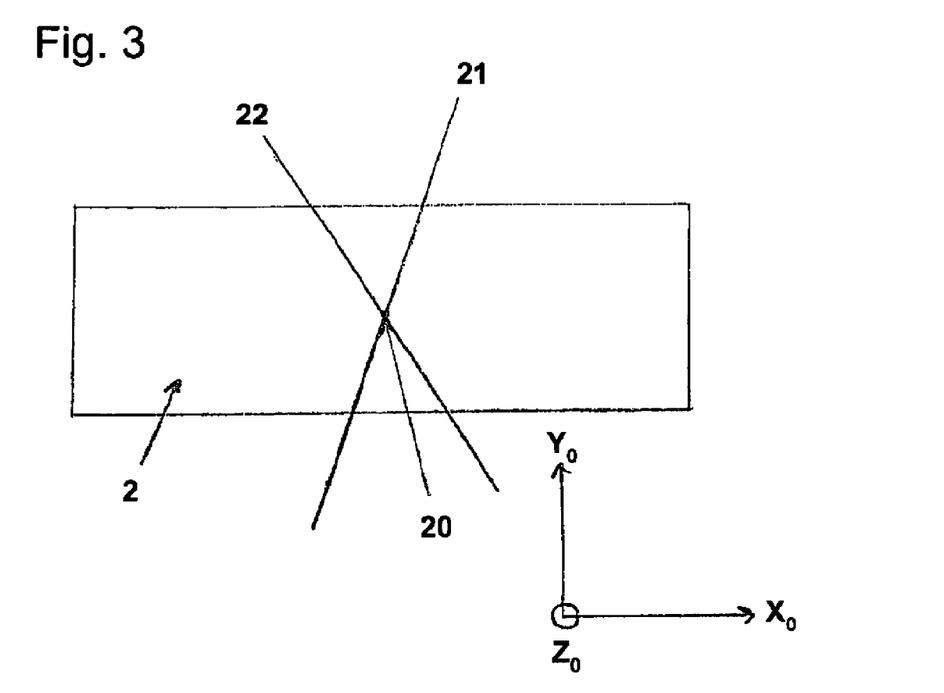
FIG. 3 shows the intersection point of the gravity lines in the intrinsic object coordinate system in a two-dimensional representation.

In FIG. 3, the object 2 is illustrated with the centroidal axis 21 of the first position and the centroidal axis 22 of the second position in the intrinsic body coordinate system $x_0$, $y_0$, $z_0$. By superimposing the two centroidal axes, an intersection point which unequivocally determines the center of mass 20 is produced. Since, because of measuring errors, it can happen that the two centroidal axes 21 and 22 do not intersect, the center of mass can be interpolated by different methods. Thus for example the shortest spacing between the two centroidal axes can be determined and the center of mass 20 can be assumed to be in the center of the spacing of the two centroidal axes. Considered mathematically, no further measurements are required for determining the center of mass. However, the quality of the measurement, in particular in the case of non-intersecting centroidal axes 21 and 22, can be improved by measuring further spatial situations or positions. Furthermore, further measurements enable calibration of the measuring system and determination of further parameters. While the basic calibration of the system is effected either externally or by tare measurement so that for example a zero offset of the sensors is known, measurement-specific parameters, such as the geometric application of the suspension points or of the inclination sensors on the object, can be identified partially from the measurement data. With knowledge of the parameters, such as cable lengths and the sensor system, and in the case of suitable scanning frequency, the inertia tensor can also be determined with oscillation of the object.

In order to determine the orientation of the object 2 in space, i.e. to undertake the transformations of the spatial coordinate system to the intrinsic body coordinate system, the ratio of the cable lengths relative to each other can be used in the simplest case. However application of one or more inclination sensors 6 or 6' on the object is more expedient, the inclination being determined relative to a previously determined reference coordinate system. It is thereby possible to use the spatial coordinate system as reference system.

In FIGS. 2a and 2b, the determination of the center of mass is undertaken with three suspension devices. With two suspension devices, the method can be implemented analogously thereto. Care must thereby be taken that, during suspension at two suspension points, the center of mass of the object lies in the plane which is provided by the connecting straight line of the two suspension points and the perpendicular thereto. By measuring at least two spatial positions, the center of mass is determined in all three dimensions. However it has proved often to be more practicable, in particular when measuring large structures, such as for ships or shipbuilding units, to suspend the object using least three suspension points.

Figure 4:
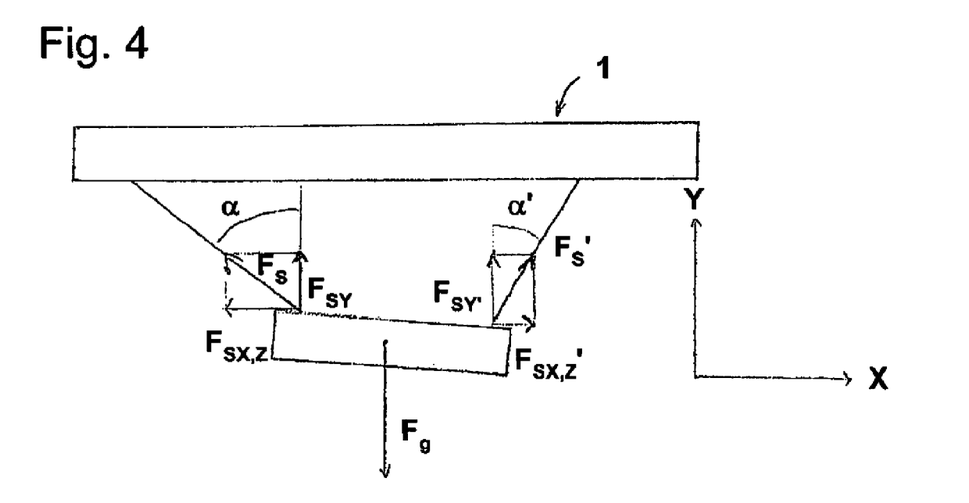
FIG. 4 shows inclined tension compensation of the method according to the invention.

With reference to FIG. 4, the different possibilities for determining the center of mass without and with inclined tension compensation of the suspension device 3, 3', 3" are described. As mentioned above, determining the center of mass involves determining the forces acting on the cables and the moments resulting therefrom with respect to the center of mass. For this purpose, three methods are possible in principle. In order to explain the principle, a two-dimensional representation in the xy-spatial plane is chosen. Determination in three dimensions is analogous thereto.

In a simple embodiment of the method, the weight $F_G$ of the object 2 is determined by the forces $F_S$ and $F_S'$ acting on the cables. This assumes that the value of force vectors $F_S$ and $F_S'$ is essentially the same as the value of force $F_G$. This method is suitable with small angles $\alpha$ between cable and the perpendicular, as is normally the case for example with long cables. In some embodiments, further inclination sensors on the suspension devices 4, 4', 4" can be dispensed with.

In a second embodiment of the method, a first inclined tension compensation is introduced. For this purpose, the force vector $F_S$ acting on the cable 4 is divided into one component along the y-direction $F_{Sy}$ and one component $F_{Sx, z}$ that acts perpendicular thereto. The weight of the object $F_G$ is now determined from the values of the force components $F_{Sy}$ and $F_{Sy}'$. However, precise information cannot yet be drawn in this way about in which direction the horizontal force components $F_{Sx, z}$ and $F_{Sx, z}''$ act. However, the first approximation by resolving the forces into their vertical and horizontal components is already very effective. In order to resolve the force vectors $F_S$ and $F_S'$ into their components, inclination sensors or manual determination of the angle $\alpha$ can be used. In some embodiments, inclination sensors can thereby determine the angle $\alpha$ automatically.

In an embodiment of the measurement method, further measuring sensors are fitted on the suspension devices 4, 4' and 4". The absolute orientation of the cable in space is measured so that the force vector $F_S$ can be resolved into its three Cartesian coordinates so that separate coordinates $F_{Sx}$, $F_{Sy}$ and $F_{Sz}$ are available. With knowledge of all the force components, a particularly precise determination of the center of mass 20 can be undertaken. In some embodiments, especially r for this form of measurement method, a cardanic suspension is used for the absolute determination of the inclination of the suspension device.

Within the scope of theoretical investigations of the different methods, it was established that the measuring accuracy of the determination of the center of mass in all three methods, i.e. without and with inclined tension compensation, a determination of the center of mass with a maximum error of 2% relative to the dimensions of the object can be implemented. By using a cardanic suspension while determining the Cartesian coordinates of the force vector, this percentage can even be reduced to below 0.5%.

Figure 5:
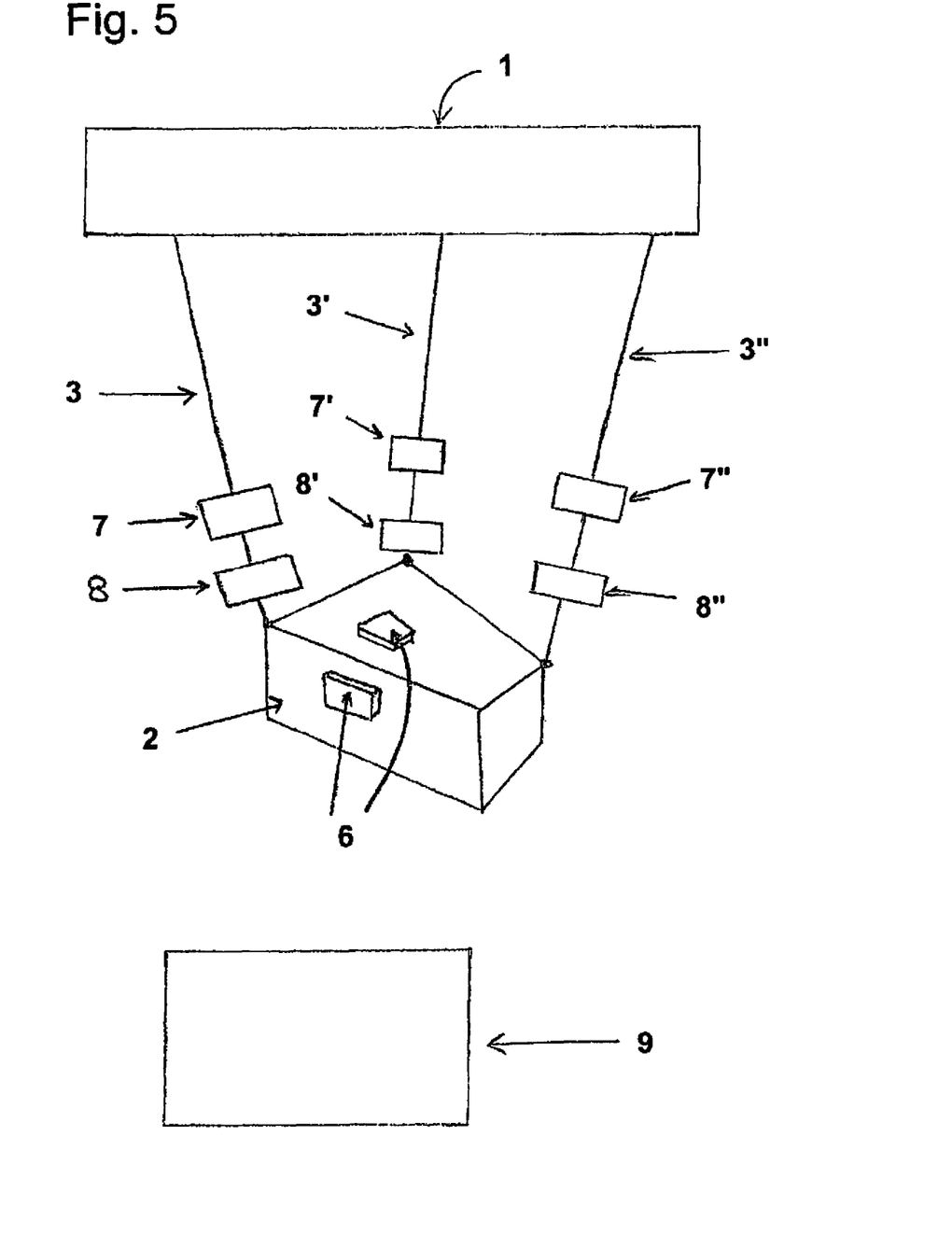
FIG. 5 shows a hoisting device with data evaluation unit.

In the embodiment illustrated in FIG. 5, a hoisting device 1 includes suspension devices 3, 3' and 3", on which an object 2 with an inclination sensor 6 applied on the object and force sensors 7 and inclination sensors 8 mounted on the cables can be seen. Furthermore, a data evaluation unit 9 is present, in which the measurements of the various sensors 6, 7, 8 are brought together and the centers of area and ultimately the center of mass of the object 2 are calculated. The measurement results of the individual sensors are transmitted without cables to the date evaluation unit by radio. This is possible in particular with very large objects as are measured for example at shipyards. With the help of a data evaluation unit, the intrinsic weight of the suspension devices which falsify the measurement results at the force sensors 7 and the inclination sensors 8 can be jointly taken into account at the same time, for example within the scope of a tare measurement, and hence enable a more accurate determination of the center of mass 20.

The method according to the invention can be implemented with available cranes. In some embodiments, the crane or a plurality of cranes have at least two suspension devices, and force measuring sensors or inclination measuring sensors are mounted on the object and on the suspension devices 3, 3', 3". With the help of a data evaluation unit 9 that receives the measuring data of the inclination sensors 6, and the forces sensors 7 the determination of the center of mass of a very large or very heavy object can be implemented within a very short time compared to previous methods. In some embodiments, the data evaluation unit 9 receives the data without cables, such as by radio.

The measurement method is suitable in particular for the measurement of maritime objects. In fact, it is difficult in many cases with the method to determine the weight and the center of mass of complete seagoing ships or other maritime large objects experimentally in their totality since these are too heavy or too large for current crane units. However the method is useful for measurements of individual structural units of seagoing ships, the structural units being able to have a weight of up to 1000 tons according to the shipyard. A final weight and center of mass determination of the finished ship is then effected via a heeling test which has been practiced almost without alteration since the beginning of industrial shipbuilding. Checking the weight and center of mass of individual structural units, which accompanies manufacture, with the help of the developed method thereby offers a good possibility before assembly of complete ship units to compare the planned and the measured data of the weights and centers of mass with each other and hence to compensate for errors already in individual structural units or by changing parts still to be manufactured with which the structural unit is in operational connection and thus to maintain the contracted operating properties of ships.

Figure 6:
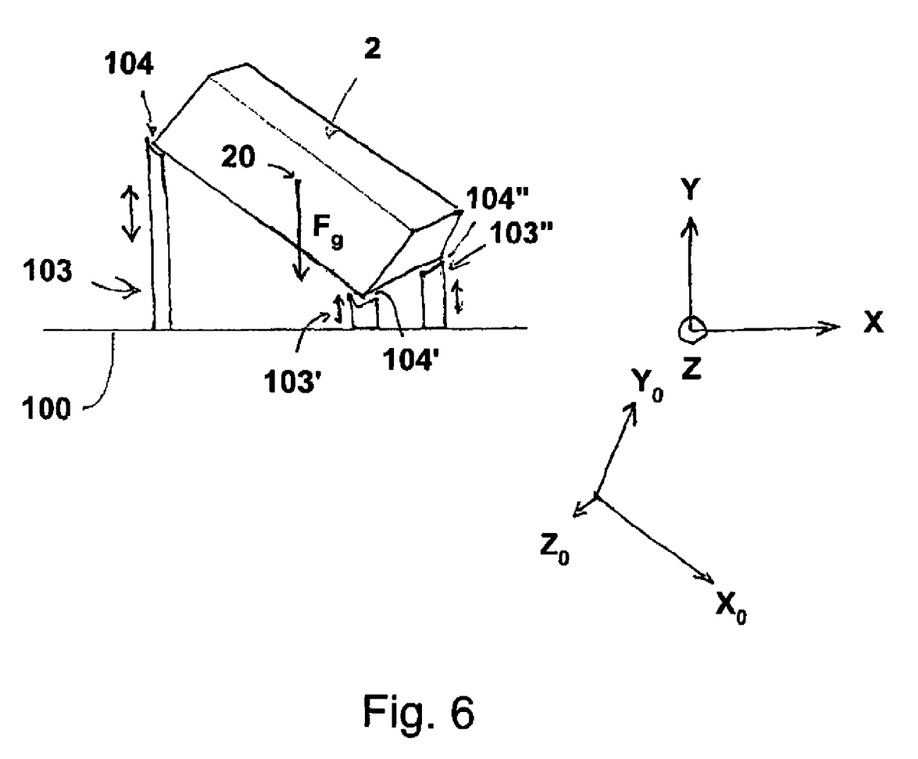
FIG. 6 shows an alternative embodiment of a hoisting device.

In FIG. 6, another embodiment for measuring the centre of mass is represented. The object 2 is not suspended on cable elements but instead is supported on three height-adjustable blocks 103, 103', 103". The support surfaces 104, 104', 104" are profiled such that the object 2 can be placed without slippage on the outer edges thereof. In order to produce the different spatial positions, the blocks 103, 103', 103" are altered in their height so that different forces act on the individual blocks 103, 103', 103". The forces are measured via force sensors disposed on the blocks. The height of a block is measured relative to the horizon 100 which is a line extending essentially in the x-direction. The horizontal can be provided for example by the ground. The inclination of the object 2 is determined by means of inclination sensors mounted on the object.

With a suitable connection between a block and an edge of the object 2, a component representation of the forces at least in the horizontal x-direction and in the vertical y-direction can be determined. An inclined pressure compensation analogous to the inclined tension compensation, as in the case of suspension on cable elements, is possible with the hoisting device represented in FIG. 6, for example with an inclined subsurface or blocks positioned at an angle.

The invention claimed is:

1. A method for determining a spatial center of mass and a mass of an object using a hoisting device, the hoisting device having at least two different suspension devices, the suspension devices each having respectively a cable element and a suspension point for connecting to the object and inclination sensors for determining an inclined position of the suspension devices, the method comprising:
   suspending the object at at least two different object points which are connected to at least two suspension points of the hoisting device, the object being suspended cardanically on the suspension devices;
   orientating the object in at least two different spatial positions;
   measuring an orientation of the object in each of the at least two different spatial positions by at least one inclination sensor mounted on the object;
   measuring forces acting on the suspension devices as a result of the object being suspended for each of the at least two spatial positions, including resolving the forces acting on the suspension devices for evaluation respectively into three independent force components;
   determining a center of area of the object for each of the at least two spatial positions, the center of area for each of the spatial positions being located along an associated force effect line and being determined by compensating for the inclined position of the suspension devices; and
   determining the spatial center of mass by superimposing the force effect lines associated with the at least two spatial positions.

2. The method according to claim 1, wherein a data evaluation unit is used to evaluate the measurements stochastically and determine the centers of area and the center of mass.

3. The method according to claim 2, wherein the measurements are transmitted without cables to the data evaluation unit.

4. The method according to claim 2, wherein the measurement values are transmitted to the data evaluation unit by radio.

5. The method according to claim 1, wherein at least one force sensor is disposed on at each of the suspension devices.

6. The method according to claim 1, wherein the forces acting on the suspension devices are measured by load shackles with integrated force sensors.

7. The method according to claim 1, wherein the hoisting device has at least one crane or a crane unit with in total at least two suspension devices.

8. The method according to claim 1, wherein during measurement of the mass of the object by a preceding tare measurement, an intrinsic mass of parts of the hoisting device is known at least partially.

9. The method according to claim 1, wherein at least three suspension devices are present.

10. The method according to claim 1, wherein the object is a ship's structural unit and the measured center of mass is compared with a planned center of mass and thus errors in the ship's structural unit are compensated for by changing parts still to be manufactured with which the structural unit is in operational connection.

11. A hoisting device comprising:
   at least first and second suspension devices each having respectively a cable element and a suspension point, the first and second suspension devices each including a cardanic suspension, the suspension devices being connected via the cable elements to the hoisting device and the cable elements respectively being able to be actuated separately and being free-hanging, each cable element respectively having a free-hanging length and the free-hanging lengths for the different cable elements being variable;

force sensors disposed on the cable elements for determining a cable force;
cable inclination sensors disposed on the suspension devices for determining a cable inclination and configured to resolve the force acting on the suspension devices into three independent force components, respectively;
an object inclination sensor configured to be mounted on an object to be suspended on the hoisting device; and
a data evaluation unit connected to the force sensors, the inclination sensors and the mounted inclination sensor.

12. The hoisting device according to claim 11, wherein at least one sensor communicates with the data evaluation unit by radio.

* * * * *